United States Patent
Nielsen et al.

[15] 3,691,150
[45] Sept. 12, 1972

[54] PROCESS FOR PREPARING PROPYLENE GLYCOL ALGINATE

[72] Inventors: Vagn Nielsen, Janelyst, Edwin Rahrs Vej, DK-8220 Brabrand; Jens Birk Lauridsen, 3, Eblehegnet, Horret Pr. DK-8230 Marslet; Kristian Stistrup Jensen, 45, Nojsomhedsbakken, DK-8220 Brabrand, all of Denmark

[22] Filed: Sept. 21, 1970
[21] Appl. No.: 74,200

[52] U.S. Cl. ............................................. 260/209.6
[51] Int. Cl. ............................................. C08b 19/10
[58] Field of Search ........... 260/209.6; 99/310; 259/9

[56]  References Cited

UNITED STATES PATENTS

| | | | |
|---|---|---|---|
| 2,426,125 | 8/1947 | Steiner | 260/209.6 |
| 2,494,911 | 1/1950 | Steiner et al | 260/209.6 |
| 2,494,912 | 1/1950 | Steiner et al | 260/209.6 |
| 2,856,842 | 10/1958 | Schwaneke et al. | 99/310 |
| 3,253,892 | 5/1966 | Brignac et al | 259/9 |
| 3,302,934 | 2/1967 | Milligan | 259/9 |

Primary Examiner—Donald E. Czaja
Assistant Examiner—Ronald W. Griffin
Attorney—Arnold Robinson

[57] ABSTRACT

In order to minimize risks of explosion and to utilize the reactor space more intensively, in the preparation of propylene glycol alginate by reacting alginic acid or partially neutralized alginic acid with propylene oxide in the presence of a diluent, the alginic material is held or conveyed at moderate speed in the reactor with the aid of stationary or slowly moving holding means adapted to permit the passage of gases and liquids, while the diluent with the propylene oxide is caused to flow through the holding means and the alginic material until the reaction is substantially completed.

1 Claim, No Drawings

PROCESS FOR PREPARING PROPYLENE GLYCOL ALGINATE

This invention relates to a process for preparing propylene glycol alginate by reacting alginic acid, which if desired may be partially neutralized, with propylene oxide in the presence of a diluent in a reaction vessel.

Propylene glycol alginate is a known substance which is very suitable as a stabilizing agent for various edible and drinkable products, especially when in an acidic environment, for instance in mayonnaise, salad dressing, and beer and also as a stabilizing agent in sherbets and many other products. The preparation of propylene glycol alginate is known for instance from U.S. Pat. Nos. 2,426,125, 2,494,911, and 2,494,912. The process consists in the reaction of propylene oxide and alginic acid, which may be partially neutralized with, e.g., sodium, calcium, and/or ammonium. In the known methods of preparing this substance the preparation takes place in a reactor resembling an autoclave and provided with a stirrer and cooling mantle, and is carried out by direct contact between the propylene oxide and the partially neutralized alginic acid while stirring. The process has the disadvantage that the available space in the reactor is utilized to a rather small extent and that a considerable risk of explosion exists when the process is carried out in this manner and in the presence of a diluent; whereas the reaction is sluggish and slow and the mass of the alginic acid component reacts difficulty if no diluent is employed.

It is the object of the invention to overcome these disadvantages and to provide a process in which the reaction takes place in a reactor, utilizing a larger part of the space of this reactor than hitherto while using diluents and simultaneously avoiding or considerably reducing the risk of explosions and still achieve an efficient conversion of the alginic starting material. This is obtained if according to the invention one employs a reaction vessel wherein the alginic starting material is held or conveyed between members allowing transverse and/or parallel passage of liquids and gases and the propylene oxide and diluent are conducted through these members and the alginic starting material until the reaction is substantially completed. Hereby it becomes possible to utilize the reactor space to a very high degree for the reactants, the diluent and the reaction product; no or no substantial open gas space will be present in the reactor and the risk of explosion will be reduced to a minimum.

The essential feature of the present process is that the alginic acid component (whereby is meant alginic acid and partially neutralized acid, i.e. salts of alginic acid) is held immobile or in a controlled manner during the reaction and the propylene oxide, together with the diluent, moves through the bed or mass of the alginic acid component. The holding of the alginic acid component may be such as to hold it completely stationary, whereby the process is a batch process; or the alginic acid component may be advanced or propelled at a moderate speed. The latter alternative is often to be preferred because the process can thus be carried out in a semi-continuous or continuous process.

The containment of the alginic acid component, possibly while conveying it, may be carried out in various ways. In a preferred embodiment the alginic acid component is placed and held in a screw conveyor situated in the reactor. The screw conveyor may be arranged in various ways. Thus, it may be a screw conveyor with unbroken, unperforated convolutions, encased in a housing having perforated walls. The walls may for instance consist of wire netting or wire gauze of suitable mesh width, the housing being placed in the reactor. The diluent-liquid with the propylene oxide is caused to flow or circulate through the housing, if desired with recirculation, and the screw conveyor is caused to rotate and thus advance the alginic acid component at a speed adapted to the temperature so as to substantially complete the reaction during the holding time of the alginic acid component in the screw conveyor and the reactor. The screw conveyor may project outside the reactor, in which case the walls of the latter are provided with suitable packings around the conveyor; in this embodiment the alginic acid component may be continuously introduced in one end and the reaction product continuously withdrawn at the other end of the screw conveyor.

It is also possible to use a screw conveyor the convolutions of which are provided with perforations allowing the passage therethrough of the liquid diluent with propylene oxide. In that case these components are introduced at one end of the conveyor, and during the forward movement of the alginic acid component by aid of the conveyor the diluent with propylene oxide move either in the same direction as the alginic acid component or preferably countercurrently to it. The speeds of the movements are adapted so that the holding time in the vessel permits substantial completion of the reaction. Also in this embodiment the screw conveyor may protrude from the reactor in order to permit a continuous reaction.

Another embodiment consists in placing the alginic acid component in baskets of wire netting or wire gauze or baskets of for instance netting made of plastics (for instance polypropylene), or in securing the alginic acid component between perforated discs or discs of wire netting, gauze netting or netting of plastics; the baskets or disc are either stationary in the reactor or conveyed slowly through the reactor while the diluent with the propylene oxide is caused to flow or circulate through the baskets or the discs holding the alginic acid component.

The process according to the invention will be illustrated hereinafter by an Example. It should be understood that this Example only serves to illustrate the process and is not to be construed as limitative of the process.

EXAMPLE

As raw materials the following are used: filtered coarsely ground high polymeric alginic acid having a dry matter content of 50%, during its preparation precipitated with a calcium compound and still having about 5 percent of its acid groups neutralized with calcium. Other substances employed are technical grade sodium acetate containing 77.1 percent of sodium acetate, pure calcium acetate containing 88.1 percent of calcium acetate, technical grade propylene oxide and technical grade methanol (diluent).

The starting alginic acid is prepared as follows:

Before the main reaction it is desired to neutralize partially the high polymeric alginic acid with sodium and calcium. Sodium acetate (524 g) is dissolved in water (650 ml), and calcium acetate (221 g) is dissolved in water (600 ml).

10.0 kg of the high polymeric alginic acid is reacted in a separate vessel, the two aqueous solutions of sodium and calcium acetate, respectively, being introduced in the separate vessel. Hereby the alginic acid is partially neutralized. To carry out the main reaction, the partially neutralized alginic acid is transferred to a reactor arranged as a vertical pressure/suction filter (diameter 45 cm, height 33 cm) containing a perforated detachable horizontal partition. Just above the partition a fine mesh steel wire netting is situated and the partially neutralized alginic acid is placed on this netting. The partially neutralized alginic acid is compressed to a volume of 30–35 liters and on top of it is placed a fine mesh steel wire netting. The latter is secured by a ring-shaped frame so that the alginic acid component is held between the two wire nettings.

At the top the reactor is provided with a vaulted lid having a central inlet for liquids, and below the lid a detachable perforated partition is inserted in order to distribute added liquid evenly over the entire cross-area of the reactor. The aforementioned lowermost partition may be provided with a plurality, for instance four, rods which extend through the wire nettings and the alginic acid secured between them. The rods are not necessary but expedient to facilitate the removal of the lowermost partition with material placed thereon.

When the partially neutralized alginic acid has been placed as described, the apparatus is gathered and closed and 34 kg of methanol and 13.1 kg of propylene oxide are introduced into the reactor. During the introduction, an escape valve is open and after the completion of the addition this valve is closed and the liquid mixture of methanol and propylene oxide is circulated by the aid of a pump from the bottom of the reactor, through the pump, a regulation valve, a flow meter, and a heat exchanger working with steam, back to the top of the reactor. The total volume of the liquid is about 65 liters, the maximal circulation rate about 80 liters per minute.

In the heat exchanger the liquid mixture is heated to the reaction temperature, e.g. 50° C, and the liquid heats the reactor and the alginic acid. The said reaction temperature is achieved in about 3 minutes and at this temperature the pressure in the system is about 1.8 atmospheres absolute. The reaction is exothermic, but not to such high a degree that chilling is needed in order to keep the reaction temperature constant, apart from the cooling which takes place from the surface of the reactor. The temperature is controlled by a pneumatic steam regulation valve.

After the necessary period for reaction, which under the circumstances specified is normally about 2½ hours, the heat exchanger is replaced by a cooler with cold water and the temperature of the system may be decreased to about 20° C in 3–4 minutes.

The liquid mixture is pumped off and the propylene glycol alginate formed by the reaction is washed with methanol.

After this, it may be desirable — but not necessary — to coat the propylene glycol alginate with propylene glycol. After the wash, about 5 liters of methanol remain in the propylene glycol alginate. 6.4 liters of propylene glycol and 28.5 liters of methanol are added whereby the product contains altogether about 40 liters of liquids. The liquid mixture is circulated in the reactor and thereafter drawn off. Again, about 5 liters of liquid remain in the propylene glycol alginate; of this liquid about 800 g are propylene glycol. The amount of pure propylene glycol alginate is about 7 kg and its contents of free propylene glycol accordingly about 11 percent.

When the liquids have been drawn off, the reactor is opened and the entire cake of propylene glycol alginate with appendant liquid is lifted. The cake has good cohesion and can be removed almost as a stopper. The cake is air dried and ground on a pin mill. About 8.5 kg of 80 percent propylene glycol alginate are obtained.

The product obtained may be analyzed for dry matter contents by drying the product and weighing the residue. In various experiments, dry matter contents of 80–95 percent were obtained.

The total amount of free, esterified and neutralized (with sodium or calcium) carboxyl groups can be assessed by decarboxylation process in which a dried sample of the product is heated with hydrochloric acid. The amount of $CO_2$ hereby evolved is an expression of the total contents of carboxyl groups. In various experiments carried out substantially as described, 17–21 percent of carbon dioxide were found; in the various experiments the analyses showed 5–35 percent free carboxyl groups, 40–85 percent esterified carboxyl groups and 10–45 percent sodium and calcium neutralized carboxyl groups.

The product prepared according to the above example contained 91.5 percent dry matter. By the decarboxylation, the content of $CO_2$ was 20.7 percent. Of the carboxyl groups, 31.9 percent were free, 47.2 percent esterified, and 20.8 percent neutralized. The viscosity of the product was 312 centipoise.

The product was tested in sherbets and gave perfectly satisfactory results, just as the results with propylene glycol alginate prepared in known manner.

The reaction time may vary from about 5 minutes to about 5 hours. The reaction temperature may vary from about 45° C to about 90° C. The degree of neutralization of the starting alginic acid will generally vary between about 10 and about 45 percent. The propylene oxide is usually used in stoichiometric excess over the amount of the alginic acid component; the amount of propylene oxide may be from 1 mol to about 25 moles per mol alginic acid. As diluent it is possible, besides methanol, to use other low-boiling alkanols such as isopropanol or ethanol, or ketones such as acetone or methyl ethyl ketone, or generally liquids commonly used as diluents in the known processes for preparing alkylene glycol esters of alginic acids.

We claim:

1. A process for preparing propylene glycol alginate by reacting at elevated temperature and super-atmospheric pressure an alginic material with propylene oxide in the presence of a diluent wherein the alginic material is filtered, coarsely ground, high polymeric alginic acid which has been partially neutralized, which comprises transferring said alginic acid into a reactor arranged as a pressure-suction filter containing a perforated-detachable partition with a fine mesh netting thereon, locating the partially neutralized alginic acid on said netting, compressing the partially neutralized acid thereon, placing a fine mesh netting thereover, securing said netting by a ring-shaped frame so that the alginic acid component is held fixedly between said two wire nettings, introducing methanol and propylene oxide in excess of the stoichiometric proportion into the upper portion of said reactor and circulating said methanol and propylene oxide through said partially neutralized alginic acid at the rate of up to about 80 liters per minute, per 10 kg of alginic acid for about 2.5 hours, cooling said system to about 20° C. then pumping off the liquid mixture, washing the resulting propylene glycol alginate with methanol and withdrawing the cake thereof from said reactor, air-drying it and grinding it.

* * * * *

UNITED STATES PATENT OFFICE
CERTIFICATE OF CORRECTION

Patent No. 3,691,150      Dated September 12, 1972

Inventor(s) Vagn Nielsen, J.B. Lauridsen, and K.S. Jensen

It is certified that error appears in the above-identified patent and that said Letters Patent are hereby corrected as shown below:

On the cover sheet: before " [22] " insert -- [73] Assignee: Aktieselskabet Grindstedvaerket --; before " [52] " insert -- [30] Foreign Application Priority Data September 29, 1969 Denmark......5175/69 --

Signed and sealed this 20th day of February 1973.

(SEAL)
Attest:

EDWARD M. FLETCHER, JR.
Attesting Officer

ROBERT GOTTSCHALK
Commissioner of Patents